United States Patent Office 3,234,308
Patented Feb. 8, 1966

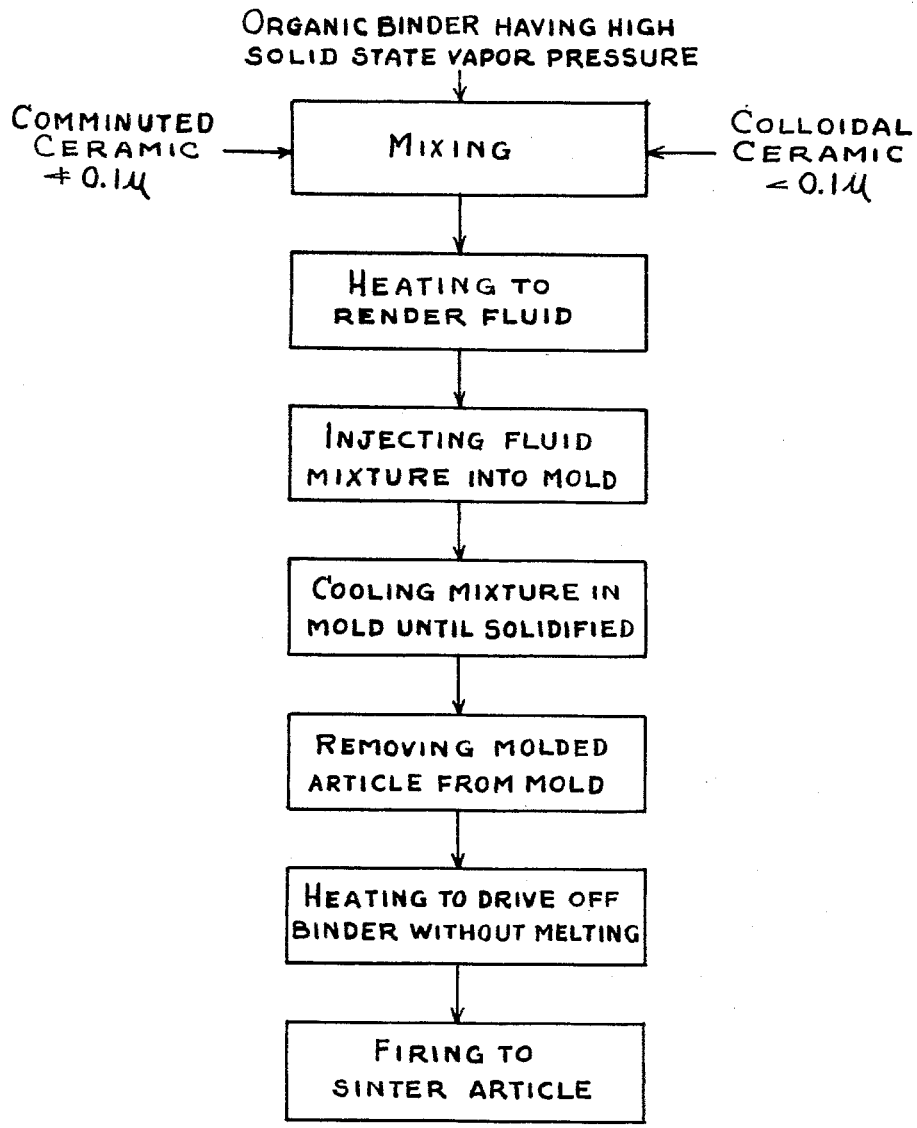

3,234,308
METHOD OF MOLDING CERAMIC ARTICLES
Eldor R. Herrmann, Corning, N.Y., assignor to Corning Glass Works, Corning, N.Y., a corporation of New York
Filed Nov. 21, 1961, Ser. No. 154,048
5 Claims. (Cl. 264—63)

This invention relates to improvements in making ceramic articles, particularly precision cores for metal casting molds, by injection molding a mixture of the ceramic material and an organic binder material which is subsequently baked out of the molded article.

The injection molding technique is well known for forming ceramic articles having intricate and complex shapes. This technique provides a rather simple one step forming operation thereby avoiding costly and time consuming machining and forming of solid bulk stock material.

Heretofore comminuted ceramic material was mixed with a plastic or resin binder material that is thermoplastic, e.g. ethyl cellulose, and a volatile liquid plasticizer, e.g. n-butyl stearate. The thermoplastic material and plasticizer proxided fluidity in the mixture at molding temperature and pressure so that it could be readily injected into the die mold to completely fill the cavity therein. The injected mixture was cooled in the die mold to harden the thermoplastic material, thereby producing a substantially rigid article. The article was removed from the mold, subjected to a "drying" step by heating up to a temperature of about 450° F. to evaporate the plasticizer from the body, and then fired to completely burn out the thermoplastic material and sinter the ceramic material.

One disadvantage of this prior method was the inordinately long time required for the "drying" step. Heat applied to the body increased the vapor pressure of the plasticizer and it also softened the thermoplastic binder. It was necessary to heat the body slowly up to the maximum drying temperature so as to avoid increasing the vapor pressure of the plasticizer faster than the vapor could be dissipated through the pores of the body. Otherwise, excessive vapor pressure within the body would cause the softened structure to crack and blister. Also the softened body would distort if not supported. This "drying" step usually took 70 hours or more.

A later improvement to the prior method reduced the "drying" time to about 24 hours by additionally including a slowly thermosetting resin material, e.g. shellac, as part of the binder. This thermosetting resin material permanently hardened or "set" during the preliminary stages of the "drying" step to give the body substantial rigidity despite the softening of the thermoplastic portion of the binder. Thus the more rigid body could accommodate a more rapid increase in vapor pressure of the plasticizer without distortion or blistering. While this improved method permitted a more rapid increase in "drying" temperature with a resulting reduction of total "drying" time, it still involved an undesirable time consuming "drying" period.

Another disadvantage of the prior methods was the very substantial shrinkage of the body, accompanied in many cases by cracking, that occurred during the "drying" and firing steps. A major amount of this shrinkage was found to occur during the "drying" step and in some cases the shrinkage began to occur earlier during cooling in the mold cavity. This shrinkage occurred regardless of whether part of the binder was thermosetting or not, although cracking was considerably less than the binder was partly thermosetting. It is believed that this shrinkage is directly attributable to the use of thermoplastic binder and to the fact that this binder becomes fluid during the bake-out, i.e. "drying" and firing steps. As an illustration of the adverse degree of shrinkage that occurs, bodies made with ethyl cellulose as the binder exhibited a linear shrinkage of at least 5%.

When making complex shaped articles of very precise dimensions, the factor of shrinkage creates a very complicated problem in the design of the die mold cavity. Moreover, all portions of an intricate shape with variations in cross-sectional area do not shrink equally or uniformly. Thus it becomes exceedingly difficult to design the dimensions of the mold cavity so as to yield an article having the necessary final precision dimensions in all its portions after firing, without requiring further machining.

It is an object of this invention to provide a method for producing ceramic articles by the injection molding technique wherein the time required for bake-out is drastically reduced.

It is another object of this invention to provide a method for producing ceramic articles by the injection molding technique wherein substantially no shrinkage (i.e. about 1% maximum linear shrinkage) occurs in the article during the bake-out of the organic constituents.

Other objects and advantages will be apparent from the following disclosure.

The sole figures of drawing is a flow sheet illustrating one form of the process according to the present invention in which colloidal ceramic having a particle size substantially smaller than 0.1 micron is utilized as the "bleeding" inhibitor, as will be more fully described below.

The process of the invention broadly comprises first preparing a molding batch composition consisting of a mixture of comminuted ceramic having a particle size not less than 0.1 micron, a solid organic binder having a high solid state vapor pressure, and at least one material effective to inhibit "bleeding" during injection selected from the group consisting of: (1) colloidal ceramic having a particle size substantially smaller than 0.1 micron and (2) thermosetting resin. Next, the batch composition is heated to render it fluid and the fluid composition is injected into a mold where it is cooled to harden it into an article having the configuration of the mold cavity. Then the article is heated to a temperature below the melting point of every constituent of its composition to drive off the solid organic binder and subsequently fired to sinter the ceramic material into a coherent body. When a thermosetting resin is included in the batch composition, it is desirably heated further, after driving off the solid organic binder and prior to firing for sintering, to set the thermosetting resin. Unlike the prior art process where this resin could be set during the heating step to drive off the liquid plasticizer used with a thermoplastic resin, the temperature for driving off the organic binder in the process of this invention is generally too low to completely cure, or set, the thermosetting resin.

For the purposes of this invention, a solid organic binder having a high solid state vapor pressure (hereinafter referred to as organic binder) is defined as an organic material that is solid at normal room temperatures, having a melting point below about 200° C. and having a vapor pressure of at least about 1 mm. within the temperature range of from about 20° C. up to the melting point of the material. Examples of suitable organic binders within this class of materials are naphthalene, paradichloro benzene and camphor.

The comminuted ceramic should be one having a particle size distribution range lower limit of not less than 0.1 micron. This is essential because ceramic powder of a particle size smaller than 0.1 micron absorbs much greater quantities of organic binder before plastic flow characteristics necessary for injection molding are obtained. The result of the necessarily excessive quantities of organic binder in this latter case is that the resulting fired body is excessively porous and too fragile for practical use. Generally the upper limit of the particle size distribution range is preferred to be less than 100 microns, but this limit is not essentially critical.

The comminuted ceramic may be any one or more of a number of glass and crystalline ceramic materials having particular properties desired for the article to be formed. A few examples of suitable materials are: 96% silica glass, fused silica, alumina, berylia, magnesia, mullite, petalite, silica and spodumene. These materials can be obtained commercially in the required comminuted form or may be prepared from raw bulk materials by ball milling or other suitable means.

The colloidal ceramic should be one having a maximum particle size substantially less than 0.1 micron, preferably less than 0.05 micron. It may be the same ceramic material as the comminuted ceramic or a different one according to the properties desired in the article to be formed. Examples of suitable commercially available materials are: Alon-C finely divided alumina and Cab-O-Sil finely divided silica (trade name products of Cabot Corporation, Boston, Mass.) and D-C Silica powder (trade name product of Dow-Corning Corporation, Midland, Mich.).

The thermosetting resin can be any one of a number of such known materials, for example, shellac and silicone resins. Gum shellac has been found particularly suitable.

The mixing of the batch composition constituents is preferably accomplished in one of two ways. In the first method, the organic binder is comminuted and mixed cold with the ceramic in a ball mill or other suitable apparatus until a substantially homogeneous mixture is obtained. In the second and preferred method, the organic binder is melted in a heated muller or other suitable apparatus, then the ceramic is added to the melted organic binder and stirred or mixed until the ceramic is uniformly dispersed in the binder. The mixture is cooled to solidify the organic binder and is comminuted or crushed into at least coarse grain granules to permit feeding of it into the molding apparatus.

When it is desired to include thermosetting resin in the batch composition, it may be mixed along with the other constituents by either of the foregoing two methods. Preferably it is melted along with the organic binder prior to adding the ceramic.

While selection of the particular method of mixing is generally optional, the first method usually does not give good results when camphor is used as the organic binder. In this case, the second method is preferred and the mixing should be done in a closed container because of the exceptionally high vapor pressure of camphor.

The resulting batch composition is fed into the charging cylinder of a conventional injection molding apparatus for ceramic molding, heated to make it fluid, i.e. above the melting point of the organic binder, and then injected into a conventional mold having a cavity with the desired configuration of the article to be produced. Preferably, the batch composition is heated to temperatures of 150° C. to 200° C. to give good plastic flow under pressures as low as 7000 to 10,000 p.s.i.

Although the basic combination of the organic binder and the comminuted ceramic produce the improved results of substantially no shrinkage and greatly shortened bake-out time, serious difficulties are encountered in injecting this basic combination as the sole batch composition. This is caused by "bleeding" or flow of the organic binder substantially alone leaving a ceramic-rich mixture behind which does not possess enough plastic flow properties for subsequent injection. It has been found necessary to add either a thermosetting resin or the colloidal ceramic powder or combinations of the two materials to prevent "bleeding,"

An injection molding batch composition found particularly successful consists of, by weight:
  (a) 10% to less than 32% of solid organic binder having a high solid state vapor pressure.
  (b) at least one material effective to inhibit "bleeding" during injection selected from the group consisting of:
    (1) colloidal ceramic having a particle size substantially smaller than 0.1 micron in an effective amount up to 4%.
    (2) thermosetting resin in an effective amount up to 8%.
  (c) comminuted ceramic having a particle size not less than 0.1 micron being the remainder.

and wherein the sum of solid organic binder plus thermosetting resin is 18% to 32%. This composition provides an excellent combination of good plastic flow properties for injection molding without detrimental "bleeding," rapid bake-out of organic binder within 12 hours or less without distortion, shrinkage or excessive porosity, and easy burn-out of the thermosetting resin without forming a shell-like layer on the ceramic.

For the purpose of illustrating this invention, the following specific examples are given.

Example I

A molding batch composition consisting of the following:

| | Parts by weight |
|---|---|
| Powdered fused silica [1] | 66.3 |
| Naphthalene | 30.1 |
| Alon-C | 3.6 |

[1] Particle size distribution range 0.1–100 microns; mean particle size 11–12 microns.

was prepared by melting the naphthalene and then slowly adding the powdered fused silica and Alon-C to the melted naphthalene while continuously stirring the mixture to develop a homogeneous mass. The composition was cooled to a solid mass and subsequently broken into pieces small enough to be introduced into a charging cylinder preheated to about 175° C. After the charging cylinder was filled with the batch composition, it was allowed to heat up to the pre-set temperature and then injected into a mold under a pressure of about 10,000 p.s.i. The injected composition was solidified in the air cooled mold, then removed and heated to 70° C. to drive off the naphthalene. The time required for this step varied from 3 to 12 hours for body thicknesses varying from ⅛″ to ½″, respectively. Next, the body was fired at 1125° C. for 2 hours to sinter the ceramic particles together. The average linear shrinkage was found to be 1.0%.

Example II

A molding batch composition consisting of the following:

| | Parts by weight |
|---|---|
| Powdered fused silica [1] | 80.4 |
| Naphthalene | 16.2 |
| Gum shellac | 3.4 |

[1] Particle size distribution range 0.1–100 microns; mean particle size 11–12 microns.

was prepared in the same manner as in Example I by melting the naphthalene and gum shellac together. The composition was then injection molded and heated to drive off the naphthalene as in Example I with the heating time for various thicknesses remaining substantially the same. Next, the body was heated relatively slowly, i.e. about 100° C. per hour, to about 400° C. to completely set or polymerize the gum shellac. Finally, the body was fired at 1125° C. for 2 hours to burn out the gum shellac and sinter the ceramic particles together. The average linear shrinkage was found to be 0.8%.

It is thought that the substantial absence of shrinkage in the articles made in accordance with the method of this invention is related to the fact that the organic binder remains solid during the bake-out whereas the prior thermoplastic binder materials became fluid during this operation. While this is merely a theory to explain the observed results, it is thought that surface tension effects of a fluid binder cause the ceramic particles to be pulled together as the binder is baked out of the body. Since the binder in accordance with this invention is solid during the bake-out, there is no fluid phase to cause shrinkage in the body.

It should be understood that the illustrated embodiments of the invention may be varied within the spirit of the invention and, accordingly, it is intended that the scope of the present invention be limited only by the appended claims.

What is claimed is:

1. The process of making ceramic articles comprising:
    (a) preparing an injection molding batch composition consisting of a mixture of comminuted ceramic having a particle size not less than 0.1 micron as the predominant constituent, an organic binder being solid at normal room temperatures, said binder having a melting point below about 200° C. and having a vapor pressure of at least about 1 mm. of Hg within the temperature range of from about 20° C. up to the melting point of said binder, and an effective amount of colloidal ceramic having a particle size substantially smaller than 0.1 micron to inhibit "bleeding" during injection,
    (b) heating the batch composition to render it flowable,
    (c) injecting the flowable composition into a mold,
    (d) cooling the injected composition in the mold to harden it into an article having the configuration of the mold cavity,
    (e) heating the article to a temperature below the melting point of every constituent of its composition to drive off the solid organic binder, and
    (f) firing the article to sinter the ceramic material into a coherent body.

2. The process of claim 1 wherein the said solid organic binder is naphthalene.

3. The process of claim 1 wherein the said solid organic binder is para-dichloro benzene.

4. The process of claim 1 wherein the said solid organic binder is camphor.

5. The process of claim 1 wherein, by weight:
    (a) the solid organic binder is present in an amount of 18% up to but less than 32% of the composition, and
    (b) the said colloidal ceramic comprises an effective amount up to 4% of the composition to inhibit "bleeding" during injection.

References Cited by the Examiner

UNITED STATES PATENTS

| Number | Date | Name | Class |
|---|---|---|---|
| 89,531 | 4/1869 | Welling | 106—241 |
| 1,934,383 | 11/1933 | Stafford | 25—156 |
| 2,328,894 | 9/1943 | Cranmer | 106—241 |
| 2,446,872 | 8/1948 | Ehlers | 25—156 |
| 2,593,507 | 4/1952 | Wainer | 264—63 |
| 2,599,236 | 6/1952 | Cramer et al. | 25—156 |
| 2,884,388 | 4/1959 | Hedlung | 106—241 |
| 2,939,199 | 6/1960 | Strivens | 264—63 |
| 2,979,401 | 4/1961 | Szymaszek | 264—63 |

FOREIGN PATENTS 489,981   8/1938   Great Britain.

ROBERT F. WHITE, *Primary Examiner.*

ALEXANDER H. BRODMERKEL, *Examiner.*